United States Patent
Kato et al.

(10) Patent No.: US 7,606,644 B2
(45) Date of Patent: Oct. 20, 2009

(54) TARGET PARKING POSITION SETTING APPARATUS AND VEHICLE PROVIDED WITH THE SAME

(75) Inventors: Masaya Kato, Toyota (JP); Yu Tanaka, Aichi-ken (JP)

(73) Assignee: Aisin Seiki Kabushiki Kaisha, Aichi-ken (JP)

(*) Notice: Subject to any disclaimer, the term of this patent is extended or adjusted under 35 U.S.C. 154(b) by 475 days.

(21) Appl. No.: 11/586,848

(22) Filed: Oct. 25, 2006

(65) Prior Publication Data

US 2007/0100543 A1 May 3, 2007

(30) Foreign Application Priority Data

Oct. 31, 2005 (JP) ............................. 2005-317732

(51) Int. Cl.
*B60Q 1/48* (2006.01)
*G08G 1/14* (2006.01)
*G06F 19/00* (2006.01)

(52) U.S. Cl. .......................... 701/36; 701/41; 701/300; 340/932.2

(58) Field of Classification Search .................... 701/36, 701/41, 1, 200, 300; 340/932.2; 348/148
See application file for complete search history.

(56) References Cited

U.S. PATENT DOCUMENTS 6,657,555 B2 * 12/2003 Shimizu et al. .......... 340/932.2

| | | | |
|---|---|---|---|
| 2001/0027363 A1 * | 10/2001 | Shimazaki et al. | 701/41 |
| 2003/0080877 A1 * | 5/2003 | Takagi et al. | 340/932.2 |
| 2004/0153243 A1 * | 8/2004 | Shimazaki et al. | 701/300 |
| 2005/0049766 A1 | 3/2005 | Tanaka et al. | |
| 2007/0010918 A1 * | 1/2007 | Shimazaki et al. | 701/1 |

FOREIGN PATENT DOCUMENTS

JP 2005-67565 A 3/2005

* cited by examiner

*Primary Examiner*—Tan Q Nguyen
(74) *Attorney, Agent, or Firm*—Sughrue Mion, PLLC

(57) ABSTRACT

A target parking position setting apparatus includes: image capturing means adapted for a vehicle and capturing an image of an outside of the vehicle; displaying means provided inside the vehicle and displaying an image captured by the image capturing means on a display screen; parking position display controlling means for displaying on the displaying means a mark representing a provisional target parking position by superimposing the mark on the image captured by the image capturing means, the parking position display controlling means moving a display position of the mark in response to an instruction of an operator and displaying on the display screen a moving direction indicator indicating a moving direction of the mark; and setting means for setting the display position of the mark on the image captured by the image capturing means as a target parking position in response to an instruction of the operator.

9 Claims, 13 Drawing Sheets

TARGET PARKING POSITION SETTING APPARATUS AND VEHICLE PROVIDED WITH THE SAME

CROSS REFERENCE TO RELATED APPLICATIONS

This application is based on and claims priority under 35 U.S.C. § 119 to Japanese Patent Application 2005-317732, filed on Oct. 31, 2005, the entire content of which is incorporated herein by reference.

FIELD OF THE INVENTION

The present invention relates to a target parking position setting apparatus, which facilitates setting a target parking position for example of a vehicle mounted with a vehicle rear movement assisting apparatus.

BACKGROUND

Drivers of vehicles, especially inexperienced drivers, are most likely to encounter difficulties in backing-in their car or parallel parking among multiple vehicle driving operations. Here, the backing-in operation represents for example a rearward movement of a vehicle for the purpose of parking the vehicle in a parking stall, a garage or the like. In the light of the foregoing, one of technologies for facilitating a vehicle driving at an event of parking is disclosed in JP2005-067565A (US2005-0049766A1). According to this technology, in a condition where a target parking frame is displayed on a display screen, and the target parking frame is set at a desired position in response to an operation of a touch panel by an operator, an electronic control unit (ECU) automatically controls steering of a vehicle so that the vehicle parks within the target parking frame.

However, according to this technology, an operation for moving the target parking frame over the display screen is not easy and setting the target parking frame is a time-consuming operation.

For example, in cases where a vehicle moves in an angled rearward direction to be parked in a parking stall, a garage or the like, an initial position, and an initial orientation of a target parking frame, which is first displayed on the display screen, affect on setting the target parking frame. For example, in order to set the target parking frame at a desired position, it is necessary to adjust a rotation angle of the target parking frame as well as vertical and lateral directions thereof. When the operator attempts to set the target parking frame at the desired position by using the display screen, an image of a rear environment of the vehicle is displayed in a planar manner, i.e., in a two-dimensional system, on the display screen. This may cause a difference between the rear environment image and the rear environment, which is visually observing with a feeling of distance. Such a difference and a reverse in the right and left direction complicate directions of the target parking frame and make it difficult to perform an operation of setting the target parking frame at the position desired by the operator.

The present invention has been made in view of the above circumstances, and provides a target parking position setting apparatus, which facilitates for an operator to understand a direction of a target parking position to be moved or rotated in response to an input operation of the operator.

SUMMARY OF THE INVENTION

According to an aspect of the present invention, a target parking position setting apparatus includes: image capturing means adapted for a vehicle and capturing an image of an outside of the vehicle; displaying means provided inside the vehicle and displaying an image captured by the image capturing means on a display screen; parking position display controlling means for displaying on the display screen a mark representing a provisional target parking position by superimposing the mark on the image captured by the image capturing means, the parking position display controlling means moving a display position of the mark in response to an instruction of an operator and displaying on the display screen a moving direction indicator indicating a moving direction of the mark; and setting means for setting the display position of the mark on the image captured by the image capturing means as a target parking position in response to an instruction of the operator.

According to anther aspect of the present invention, a vehicle includes: image capturing means adapted for a vehicle and capturing an image of an outside of the vehicle; displaying means provided inside the vehicle and displaying an image captured by the image capturing means on a display screen; parking position display controlling means for displaying on the display screen a mark representing a provisional target parking position by superimposing the mark on the image captured by the image capturing means, the parking position display controlling means moving a display position of the mark in response to an instruction of an operator and displaying on the display screen a moving direction indicator indicating a moving direction of the mark; setting means for setting the display position of the mark on the image captured by the image capturing means as a target parking position in response to an instruction of the operator; and guiding means for guiding the vehicle to the target parking position set by the setting means.

According to still another aspect of the present invention, a computer program implements the processes for: capturing an image of the outside of a vehicle by an image capturing device; displaying the image captured by the image capturing device on a display device; superimposing a mark representing a provisional target parking position of the vehicle on the captured image and displaying the mark on the displaying device; moving a display position of the mark on a display screen of the display device in response to an operation by an operator; and displaying a moving direction indicator representing a moving direction of the mark on the display screen of the display device in response to an operation by the operator.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A vehicle guiding apparatus provided with a target parking position setting apparatus according to an embodiment of the present invention is described herein with reference to the attached drawing figures.

Figure 1:
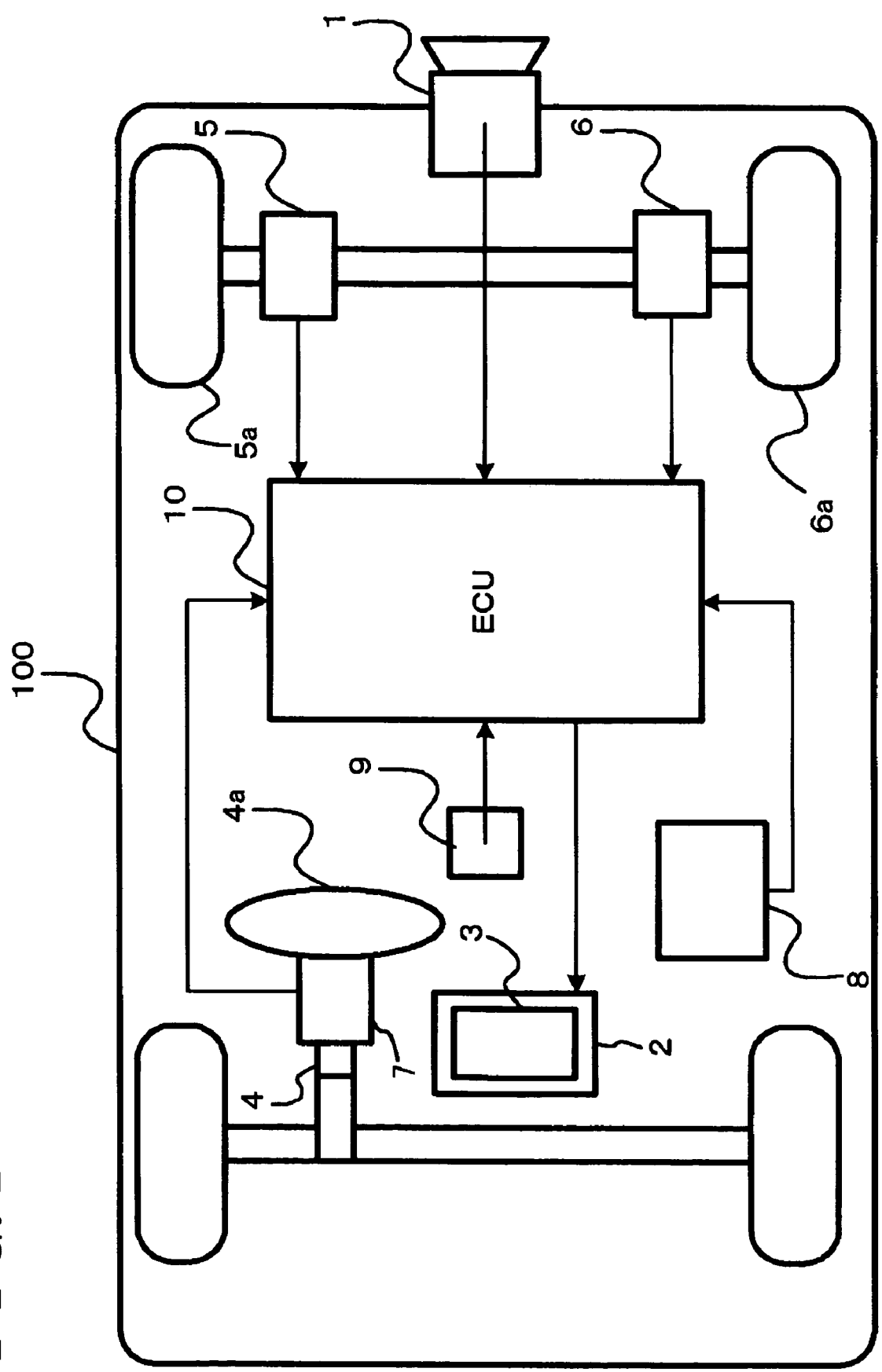
FIG. 1 is a block view illustrating an entire structure of a vehicle on which a target parking position setting apparatus according to an embodiment of the present invention is mounted.
Figure 2:
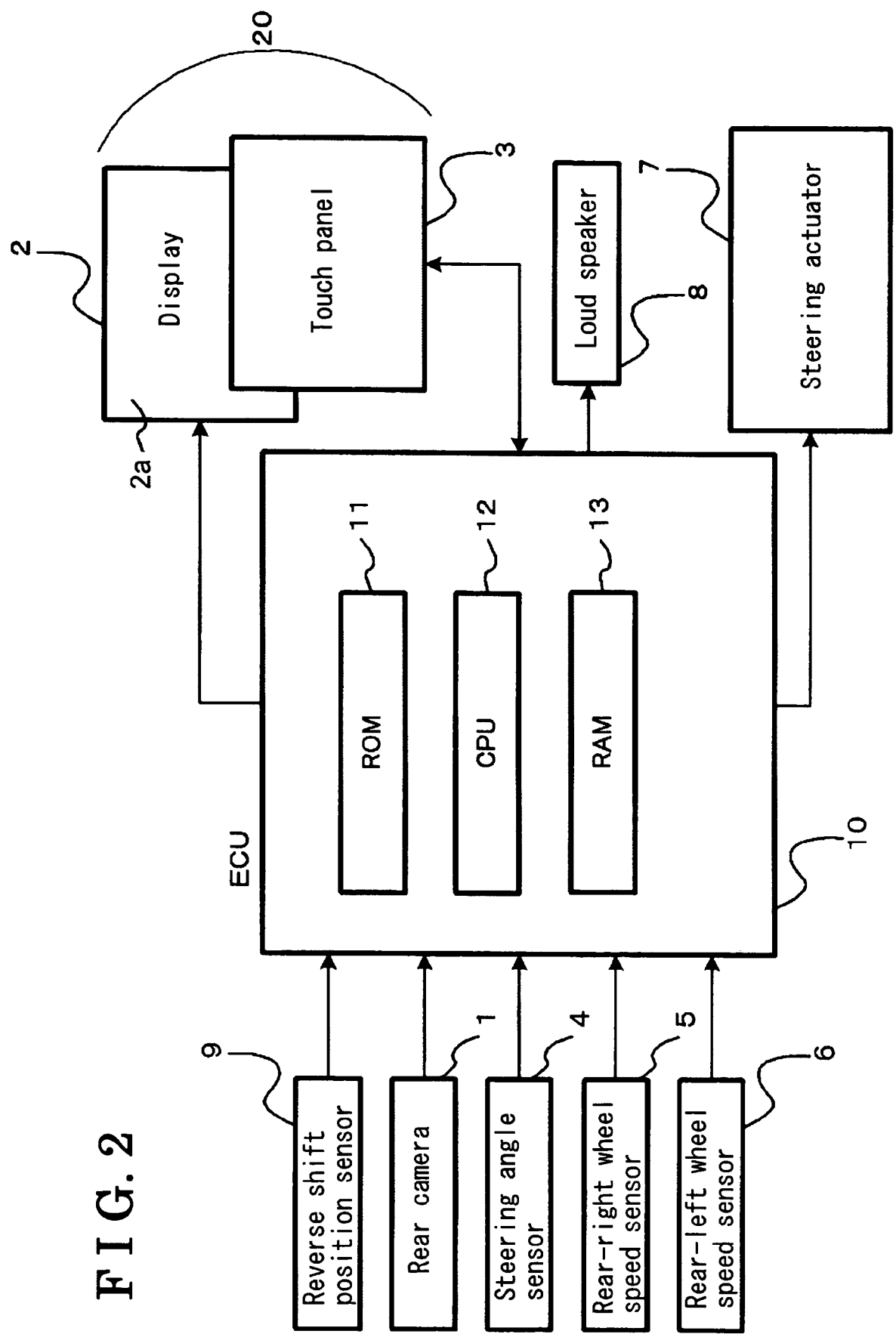
FIG. 2 is a circuit block view illustrating a control system of the vehicle in FIG. 1.

FIG. 1 is a block view illustrating an entire structure of a vehicle, on which a target parking position setting apparatus according to the embodiment of the present invention is mounted. FIG. 2 is a circuit block view for explaining a control system of the vehicle. As illustrated in FIGS. 1 and 2, the target parking position setting apparatus includes: a rear camera 1 (image capturing means); a display 2; an operation portion 3; a steering angle sensor 4; a rear-right wheel speed sensor 5; a rear-left wheel speed sensor 6; a steering actuator 7; a loud speaker 8; a reverse shift position sensor 9; and an ECU (electrical control unit) 10 (parking position display controlling means).

The rear camera 1 is configured with for example a CCD camera and so on and is fixedly mounted on a vehicle 100. The rear camera 1 captures an image of a rear environment of the vehicle 100.

The display 2 displays the image captured by the rear camera 1 on a display screen 2a thereof. Furthermore, the display 2 superimposes a target parking position, which is signal-processed by the ECU 10, on the information of the image captured by the rear camera 1 so that the target parking position is displayed on the display screen 2a.

The operation portion 3 includes a transparent touch panel, which is arranged to lie on the display screen 2a of the display 2 and is provided with multiple touch keys. An operator operates the operation portion 3, such as inputs a target parking position, selects a parking mode, and so on, and these operations are transmitted as commands to the ECU 10.

The display 2 and the operation portion 3 structure a touch panel display 20 (displaying means). The operation portion 3 can be keys, such as a cross-hair cursor key or function key, which are separated from the display 2.

The steering angle sensor 4 is a sensor which detects a rotation angle of a steering wheel 4a.

The rear-right wheel speed sensor 5 is mounted on a rear-right vehicle wheel 5a and detects a rotation speed of the rear-right vehicle wheel 5a. The rear-left wheel speed sensor 6 is mounted on a rear-left vehicle wheel 6a and detects a rotation speed of the rear-left vehicle wheel 6a.

The steering angle sensor 4, the rear-right wheel speed sensor 5 and the rear-left wheel speed sensor 6 are operatively associated with the ECU 10 and detect a traveled distance, a current position, and an estimated position of the vehicle 100. The estimated position of the vehicle 100 is a position after the movement of the vehicle 100 from the current position.

The steering actuator 7 automatically controls a steering of the vehicle 100. More particularly, the ECU 10 actuates the steering actuator 7 to automatically control a steering of the steering wheel 4a until the vehicle 100 reaches the target parking position.

The loud speaker 8 is a device, which emits sound or a voice. When the steering actuator 7 is controlled by the ECU to automate a steering of the steering wheel 4a, the ECU 10 send a signal to the loud speaker 8 to warn the operator of an initiation of the automatic steering and to audibly guide during the automatic steering.

The reverse shift position sensor 9 is a sensor which detects a position of a shift lever (not shown). The reverse shift position sensor 9 detects a shift operation of the shift lever to a reverse position or a shift operation in a transmission (not shown) and sends a command signal to the ECU 10.

The ECU 10 includes: an ROM (Read Only Memory) 11; a CPU (Central Processing Unit) 12; and a RAM (Random Access Memory) 13.

The ECU 10 receives a reverse signal outputted from the reverse shift position sensor 9 and displays an image of a rear environment of the vehicle 100, which is captured by the rear camera 1, on the display 2.

Further, once the ECU 10 receives the reverse signal outputted from the reverse shift position sensor 9, the ECU 10 activates the display 2 to superimpose a target parking frame, which represents a target parking position of the vehicle 100, on an image of the rear environment of the vehicle 100 captured by the rear camera 1 and to display on the display screen 2a both of the image of the rear environment and the target parking frame. The ECU 10 further enables to move or relocate the target parking frame in response to an operation of the operator. According to the embodiment, the ECU 10 colors an edge of the target parking frame, which is most closely located to or corresponds to a moving direction of the target parking frame (the mark representing the provisional target parking position and the target parking position), and displays the colored edge on the display screen 2a of the display 2. This therefore assists the operator to recognize the moving direction of the target parking frame and to set the target parking frame on the display screen 2a of the display 2 (setting means). The ECU 10 farther sets the target parking frame, which has been relocated at a desired position, as a target parking position in response to an instruction by the operator.

Meanwhile, the ECU 10 measures a moving distance, and a current position of the vehicle 100, based upon the information transmitted from the steering angle sensor 4, the rear-right wheel speed sensor 5, and the rear-left wheel speed sensor 6.

Further, the ECU 10 calculates a parking route on the basis of the measured current position of the vehicle 100 and the target parking frame, which has been set on the display screen 2a of the display 2. The ECU 10 then controls the steering actuator 7 and the loud speaker 8 on the basis of the parking route so that the vehicle 100 is parked inside of the target parking frame.

The ROM 11 memorizes therein programs for controlling the CPU 12. The ROM 11 further memorizes therein a conversion program between a world coordinate system and an image coordinate system. The world coordinate system is employed to measure a current position of the vehicle 100, to set a target parking position, and to guide the vehicle 100 to the target parking position. The image coordinate system is employed to display on the display 2 the target parking position.

The CPU 12 implements the programs stored in the ROM 11 for various calculations and controls.

The RAM 13 functions as a work area of the CPU 12. Further, the RAM 13 memorizes therein a steering angle detected by the steering angle sensor 4 and an information representing a speed of the vehicle 100 detected by the rear-right wheel speed sensor 5 and the rear-left wheel speed sensor 6. Still further, the RAM 13 memorizes therein a parking mode flag, which represents a parallel parking and a back-in parking (parking rearward).

Described below is an operation implemented by the touch panel display 20 with reference to the attached drawing figures.

Figure 3:
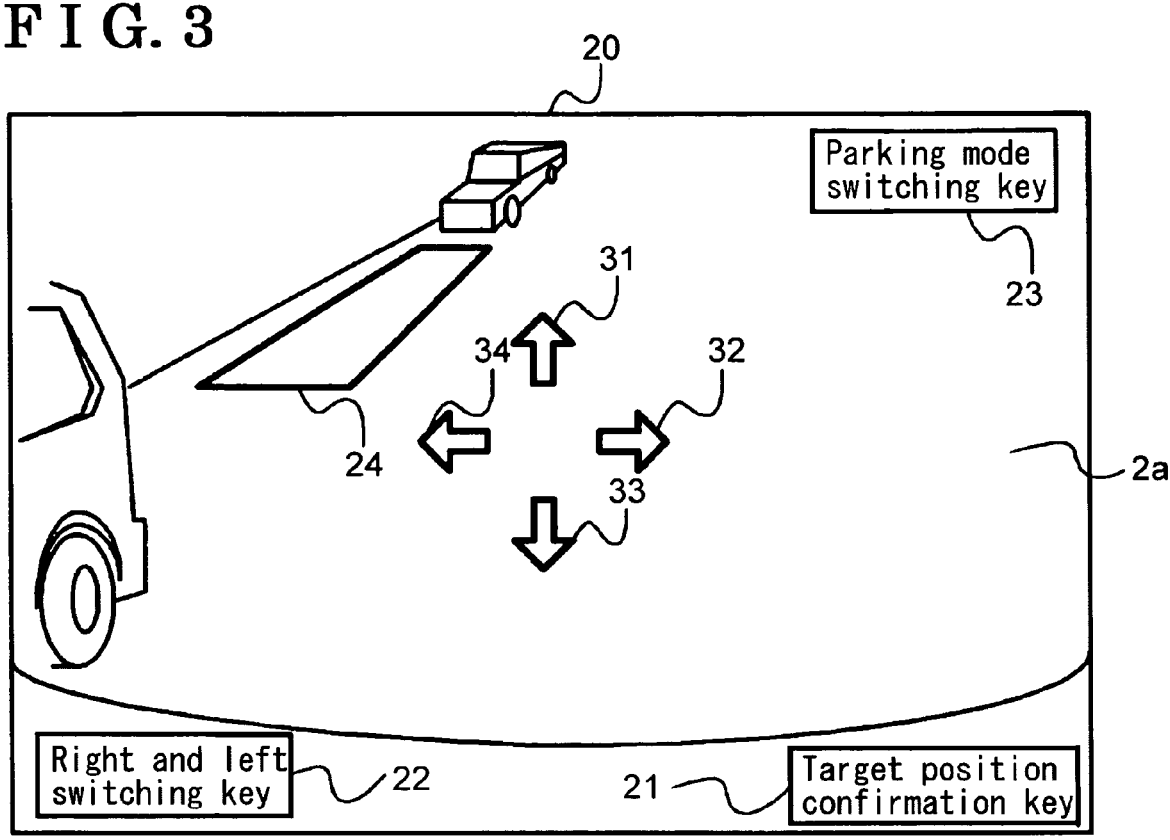
FIG. 3 is an explanatory view for explaining an operation of a touch panel display when performing parallel parking of the vehicle.

As will be described later, once a shift lever (not shown) is operated to a reverse position or range, the ECU 10 controls the rear camera 1 to be turned on. The ECU 10 further controls the display 2 to display, on the display screen 2a thereof, an image captured by the rear camera 1 and a set-up screen for setting a parking position for a parallel parking as illustrated in FIG. 3.

More specifically, the ECU 10 refers to a traveling route, and a current position of the vehicle 100 and computes an initial value representing a target parking position of the vehicle 100. The ECU 10 then combines a target parking frame 24, which is a mark representing the provisional target parking position and the target parking position of the vehicle 100, into the image captured by the rear camera 1 and displays such combined information on the display screen 2a of the display 2. Further, the ECU 10 controls the touch panel display 20 and displays on the captured image: a target position confirmation key 21 at a right bottom area of the display screen 2a; a right and left switching key 22 at a left bottom area of the display screen 2a; a parking mode switching key 23 at a right upper area of the display screen 2a. The target position confirmation key 21 is a touch key pressed to confirm a target parking position of the vehicle 100. The right and left switching key 22 is a touch key for repeatedly switching a displayed position of the target parking frame 24 between a left upper portion of the display screen 2a and a right upper portion thereof. The parking mode switching key 23 is a touch key for repeatedly switching a parking mode of the vehicle 100 between a back-in parking mode and a parallel parking mode.

The target parking frame 24 is an image which is processed by converting a target parking position on earth to the image captured by the rear camera 1 of the vehicle 100.

The ECU 10 controls the display 2 to display touch keys, at areas of the touch panel display 20, that do not lie on the image of the target parking frame 24. Those touch keys are represented as follows; an up-pointing indication key 31 (up-pointing indicator); a right-pointing indication key 32 (right-pointing indicator); a down-pointing indication key 33 (down-pointing indicator); and a left-pointing indication key 34 (left-pointing indicator). Therefore, it is possible to smoothly operate these indication keys 31, 32, 33 and 34 while recognizing a shifting of the image of the target parking frame 24 on the touch panel display 20. The up-pointing indication key 31 is operated for shifting or moving the target parking frame 24 in an upward direction. The right-pointing indication key 32 is operated for shifting or moving the target parking frame 24 in a rightward direction. The down-pointing indication key 33 is operated for shifting or moving the target parking frame 24 in a downward direction. The left-pointing indication key 34 is operated for shifting or moving the target parking frame 24 in a leftward direction.

In response to pressing the parking mode switching key 23, the ECU 10 repeatedly controls a parking mode between the parallel parking mode and the back-in parking mode.

Figure 4:
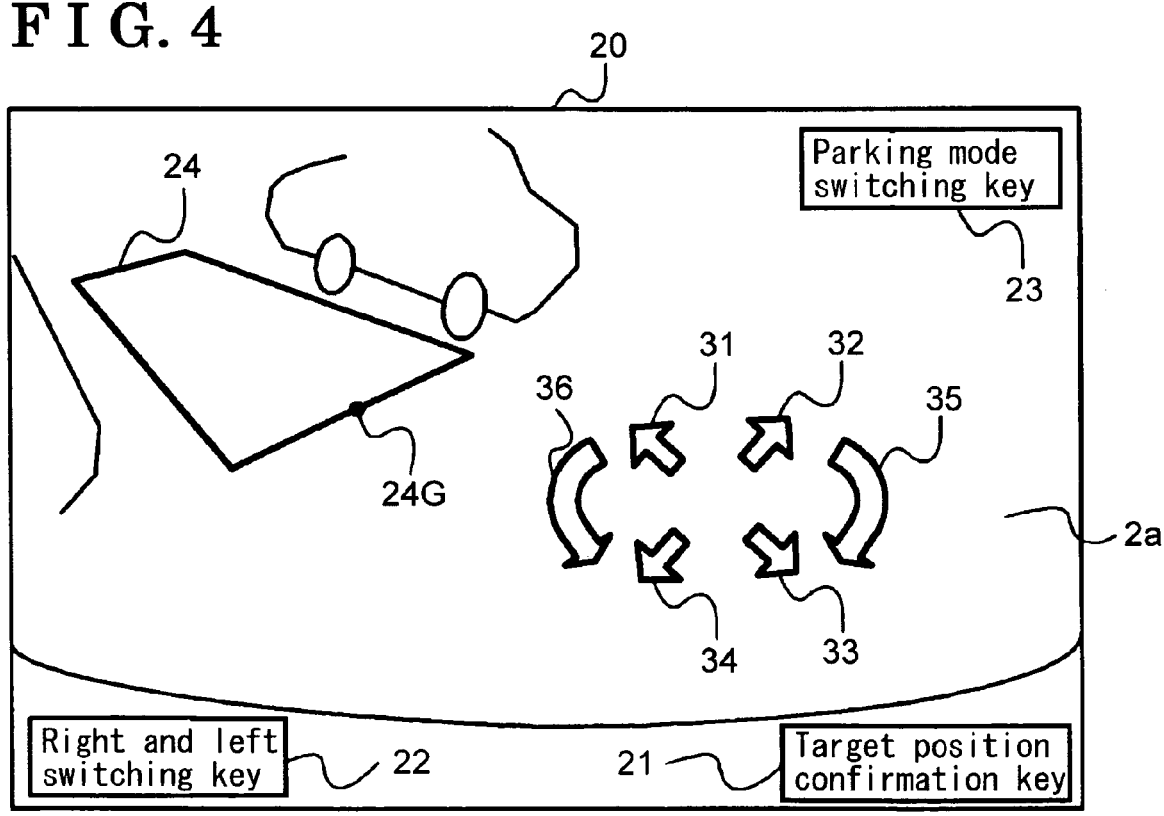
FIG. 4 is an explanatory view for explaining an operation of the touch panel display when performing back-in parking of the vehicle.

When the back-in parking mode is selected, as illustrated in FIG. 4, a clockwise-rotation indication key 35 (clockwise-rotation indicator) and a counterclockwise-rotation indication key 36 (counterclockwise-rotation indicator) are displayed on the touch panel display 20 in addition to the aforementioned indication keys 31, 32, 33 and 34. The clockwise-rotation indication key 35 is operated to rotate or move the target parking frame 24 in a clockwise direction. The counterclockwise-rotation indication key 36 is operated to rotate or move the target parking frame 24 in a counterclockwise direction.

The orientations of the indication keys 31, 32, 33 and 34 are adjusted corresponding to the orientation of the target parking frame 24.

In response to pressing the clockwise-rotation indication key 35, the ECU 10 controls the target parking frame 24 to rotate clockwise about a basic point 24G at a front of the target parking frame 24. Likewise, in response to pressing the counterclockwise-rotation indication key 36, the ECU 10 controls the target parking frame 24 to rotate counterclockwise about the basic point 24G of the front of the target parking frame 24.

According to the embodiment, the basic point 24G, which serves as an axis for rotation of the target parking frame 24, is placed at a center of a front edge of the target parking frame 24. Alternatively, the basic point 24G can be placed at a center of the frame, a center of the rear edge of the frame, or each corner of the frame.

In response to pressing the right and left switching key 22, a displayed position of the target parking frame 24 is repeatedly switched between the left upper area of the display screen 2a and the right upper area thereof.

When any of the indication keys 31, 32 33 and 34 are pressed, the ECU 10 controls the target parking frame 24 to move on the display screen 2a in a direction associated with the operations of the indication keys 31, 32 33 and 34. Further, the ECU 10 displays an edge of the target parking frame 24, which is most closely located to or corresponds to a moving direction, with a reaction color being different from the color of the other edges of the frame. As a result, an operator recognizes with ease in which direction the target parking frame 24 is moving on the display screen 2a, thus shortening a time period for confirming the target parking frame.

When any of the indication keys 35 and 36 are pressed, the ECU 10 controls the target parking frame 24 to turn or rotate on the display screen 2a and displays the edge of the target parking frame 24, which is most closely located to or corresponds to a rotating direction, with a reaction color.

An operator presses any of the indication keys 31, 32, 33, 34, 35 and 36 and moves the target parking frame 24 on the display screen 2a. When the target parking frame 24 reaches a desired target parking position, the operator presses the target position confirmation key 21. The ECU 10 confirms, as a target parking position, a position of the target parking frame 24 when activating the target position confirmation key 21. The ECU 10 then controls the steering actuator 7 and the loud speaker 8 and initiates guiding the vehicle 100 to the target parking position.

After confirming the target parking position, the target position confirmation key 21 is changed to a cancel key for canceling the vehicle guiding.

As described above, according to the embodiment, an edge of the target parking frame 24, which is most closely located to or corresponds to a moving direction, is displayed with an reaction color which is different from a color of the other edges of the frame. This makes it easier for an operator to recognize an operating direction on the display screen 2a, and this shortens a period of time for confirming a target parking position.

Descried below is an operation of the vehicle guiding apparatus with the above-described structure with reference to flowcharts and several views.

Figure 5:
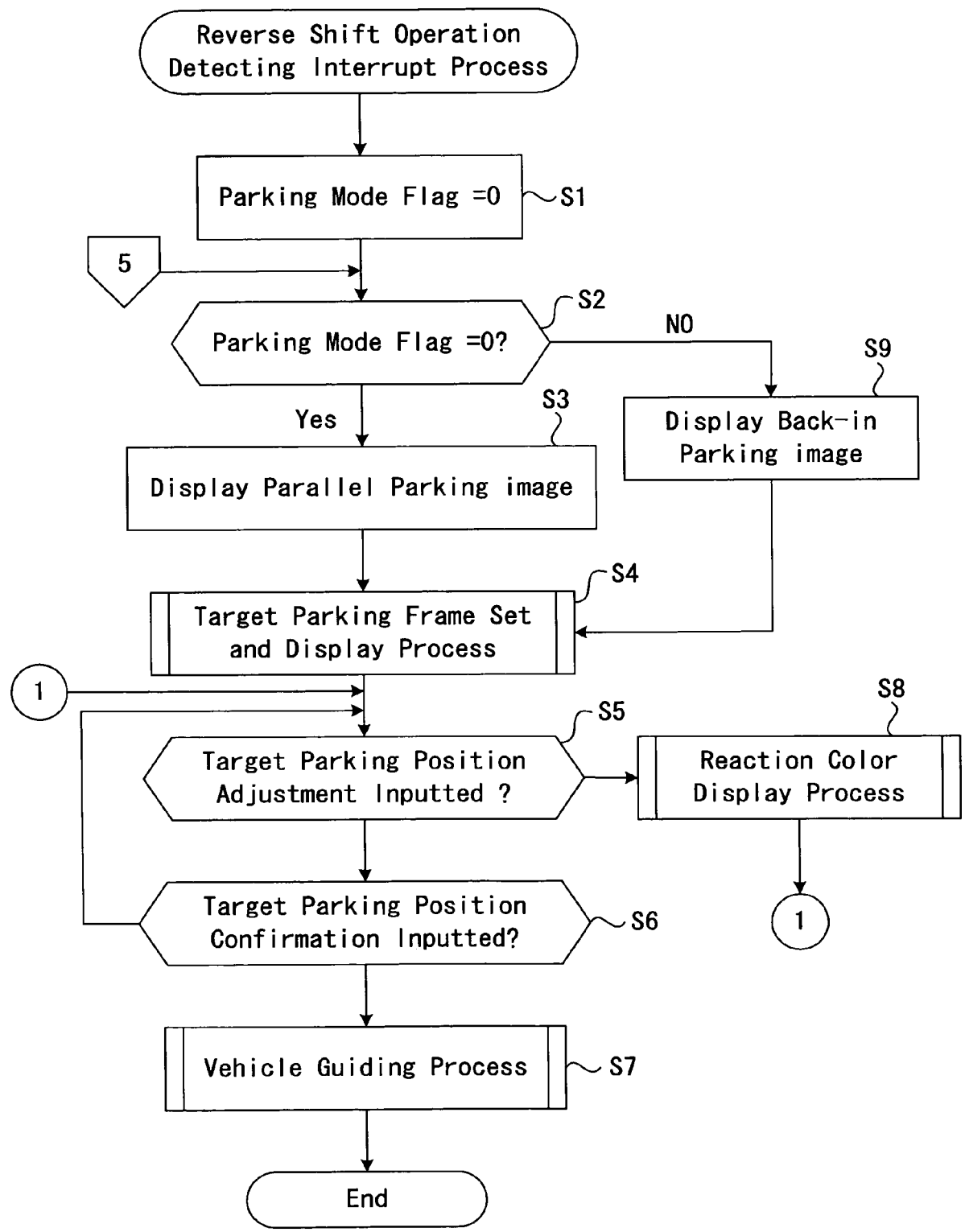
FIG. 5 is a flowchart of a reverse shift operation detection interrupt process for explaining an operation of the target parking position setting apparatus.

FIG. 5 is a flowchart for explaining a reverse shift operation detecting interrupt process implemented by the ECU 10.

When the CPU 12 of the ECU 10 detects, based on the result detected by the reverse shift position sensor 9, a position of a shift lever at a reverse shift position/range, the CPU 12 initiates the reverse shift operation detecting interrupt process illustrated in FIG. 5.

In step S1, the CPU 12 first sets a default vale "0" as the parking mode flag in the RAM 13. The parking mode flag is referred to judge whether the current parking mode is a parallel parking or a back-in parking. When the current parking mode is a parallel parking, the parking mode flag is set at "0", while, when the current parking mode is a back-in parking, the parking mode flag is set at "1". The default value of the parking mode flag is "0" which represents a parallel parking.

The program proceeds to step S2 in which the CPU 12 judges the parking mode flag memorized in the RAM 13.

When pressing the parking mode switching key 23 by an operator, this parking mode flag is repeatedly switched between "0" and "1". This switching operation of the parking mode flag is explained with reference to the flowchart illustrated in FIG. 6.

Figure 6:
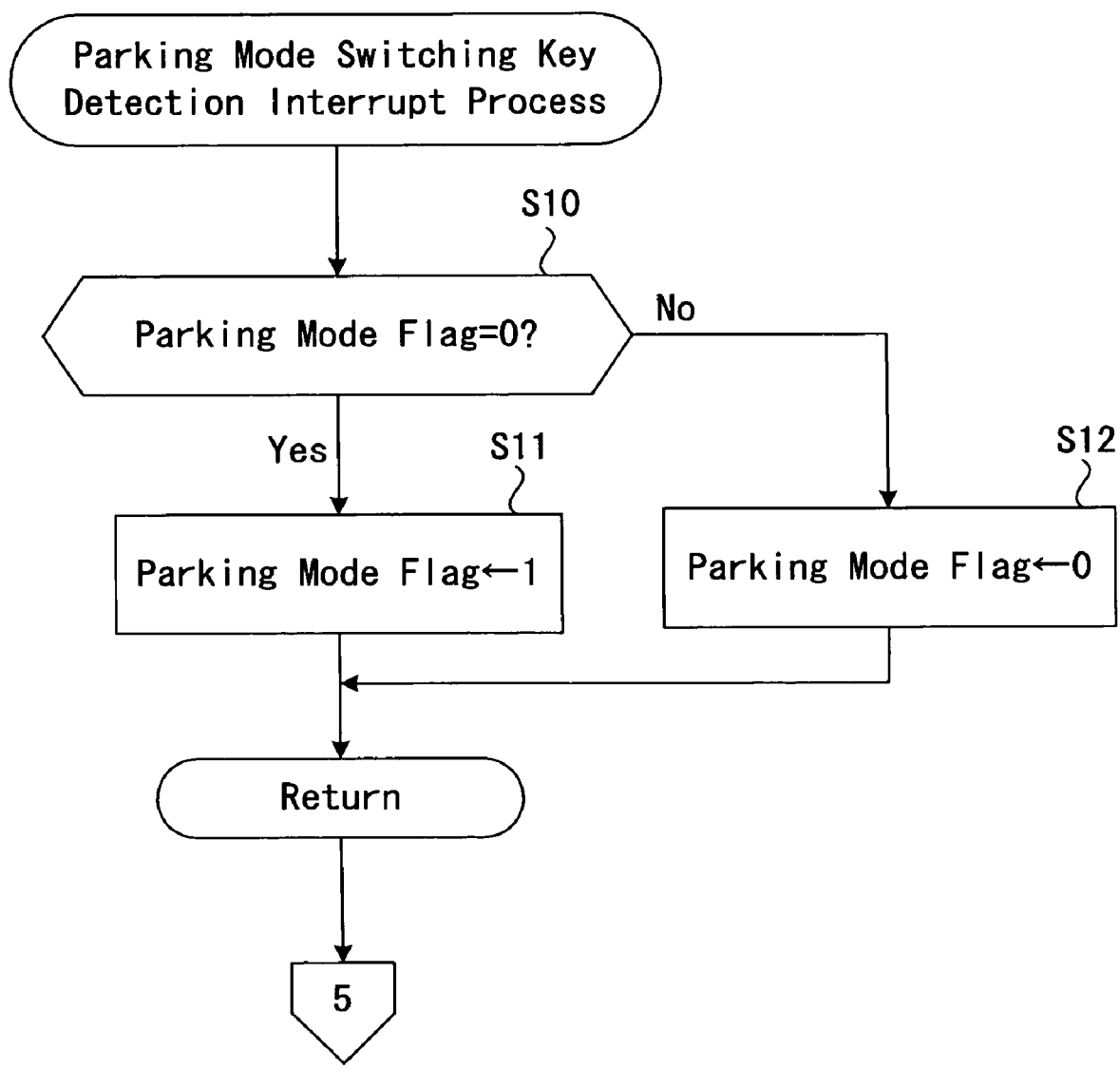
FIG. 6 is a flowchart for explaining a parking mode switching key detection interrupt process of the target parking position setting apparatus.

When the CPU 12 detects the pressing of the parking mode switching key 23, the parking mode switching key detection interrupt process of the flowchart in FIG. 6 is initiated. In step S10, the CPU 12 judges the parking mode flag.

When the value of the parking mode flag is "0" in step S10, an affirmative answer "yes" is obtained and the program proceeds to step S11. In step S11, the CPU 12 sets the parking mode flag at "1". On the other hand, when the value of the parking mode flag is "1" in step S10, a negative answer "no" is obtained and the program proceeds to step S12. In step S12, the CPU 12 sets the parking mode flag at "0".

When the process in step S11 or S12 is completed, the program returns to step S2 of the reverse shift operation detecting interrupt process in FIG. 5. In step S2, the CPU 12 judges the value of the parking mode flag.

When the CPU 12 judges that the parking mode flag is "0" representing a parallel parking in step S2, an affirmative answer "yes" is obtained and the program proceeds to step S3. In step S3, the CPU 12 activates the touch panel display 20 to display the indication keys 31, 32, 33 and 34 and an image of a rear environment of the vehicle 100 captured by the rear camera 1, as illustrated in FIG. 3.

On the other hand, when the CPU 12 judges that the parking mode flag is "1" representing a back-in parking in step S2, a negative answer "no" is obtained and the program proceeds to step S9. In step S9, the CPU 12 activates the touch panel display 20 to display the indication keys 31, 32, 33, 34, 35 and 36 and an image of a rear environment of the vehicle 100 captured by the rear camera 1, as illustrated in FIG. 4.

Figure 7:
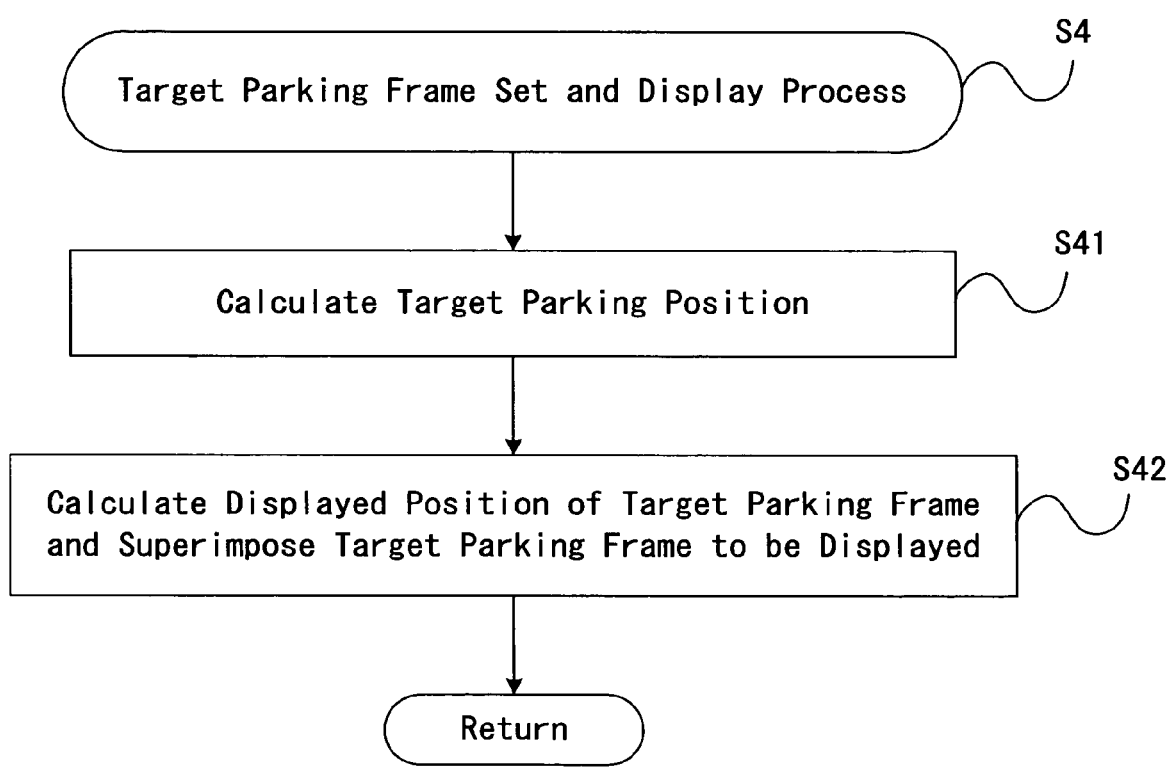
FIG. 7 is a flowchart for explaining a target parking frame set display process illustrated in FIG. 5.

Next, the program proceeds to step S4 for implementing target parking frame set and display process so that the operator can attempt setting the target parking frame 24. The target parking frame set and display process is explained by the flowchart illustrated in FIG. 7.

In step S41, the CPU 12 performs a program in which the ROM 11 memorizes an initial position (a provisional position), at which the target parking frame 24 should be displayed on the display screen 2a, in response to the parking mode. The initial position of the target parking frame 24 is computed in accordance with a world-coordinate system and is memorized in the RAM 13. The initial position of the target parking frame 24 is computed in accordance with a known computing method which refers to whole length, maximum width and wheel base of the vehicle 100 and a steering angle immediately prior to the start of the parking operation.

In step S42, the CPU 12 performs a coordinate conversion program. That is, the target parking frame 24 depicted in a world-coordinate orientation, which was calculated by the step S41 and has been memorized in the RAM 13, is converted to the target parking frame 24 in an image-coordinate orientation. The target parking frame 24 in an image-coordinate orientation is superimposed on the image captured by the camera 1 and is displayed on the touch panel display 20.

For example, a point A (X, Y, Z) plotted in the world coordinate system is transformed into a point a (x, y) plotted in the image coordinate system, i.e., on the xy-plane, in accordance with the following Formula 1 and Formula 2.

$$a = P \begin{bmatrix} A \\ 1 \end{bmatrix} \quad \text{Formula 1}$$

$$P = C \begin{bmatrix} R \\ T \end{bmatrix} \quad \text{Formula 2}$$

In these formulas, P indicates a projection transformation matrix of 3×4 corresponding to the display 2, C indicates an inner parameter of the rear camera 1, R indicates a rotational movement and T indicates a parallel movement, all of which are stored in the ROM 11.

As described above, the target parking frame 24, which is calculated on the world coordinate system, is transformed to the target parking frame 24 on the image coordinate system in accordance with the above-described formulas. The target parking frame 24 in the image-coordinate orientation is superimposed on the image captured by the rear camera 1. The program then proceeds to step S5 in FIG. 5.

In step S5, the operator visually recognizes the target parking frame 24 displayed in step S4 and judges the necessity of adjusting or modification of the displayed position of the target parking frame 24. When the modification is needed, the program proceeds to step S8 in which the operator operates any of the indication keys 31-36. As a result, the target parking frame 24 is moved and/or rotated on the display screen 2a. On the other hand, when the target parking frame 24 is displayed at an appropriate position, the program proceeds to step S6 in which the operator operates the target position confirmation key 21.

In steps S5 and S6, the CPU 12 stands ready to the next operation until the operator performs the above-described operation of the key. In step S5, when the CPU 12 judges that the operator has pressed any of the keys, an affirmative answer "yes" is obtained and the program proceeds to step S8. In step S8, the CPU 12 moves and/rotates the target parking frame 24 and starts a reaction color display process by which an edge of the target parking frame 24 is displayed with an reaction color. In this case, the edge of the target parking frame 24 is most closely located to or corresponds to the moving/rotating direction.

Figure 8:
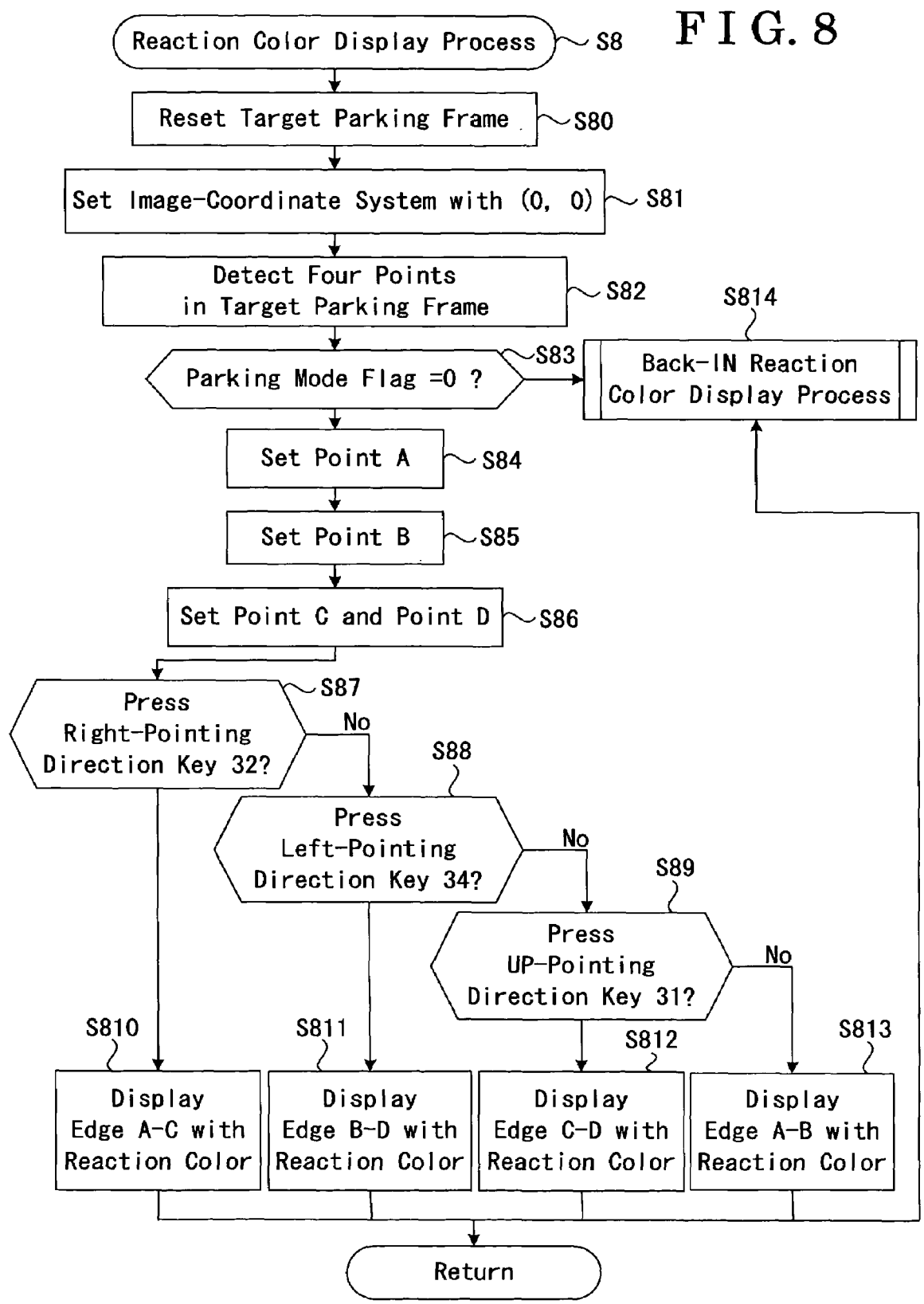
FIG. 8 is a flowchart for explaining a reaction color display process in FIG. 5.
Figure 13:
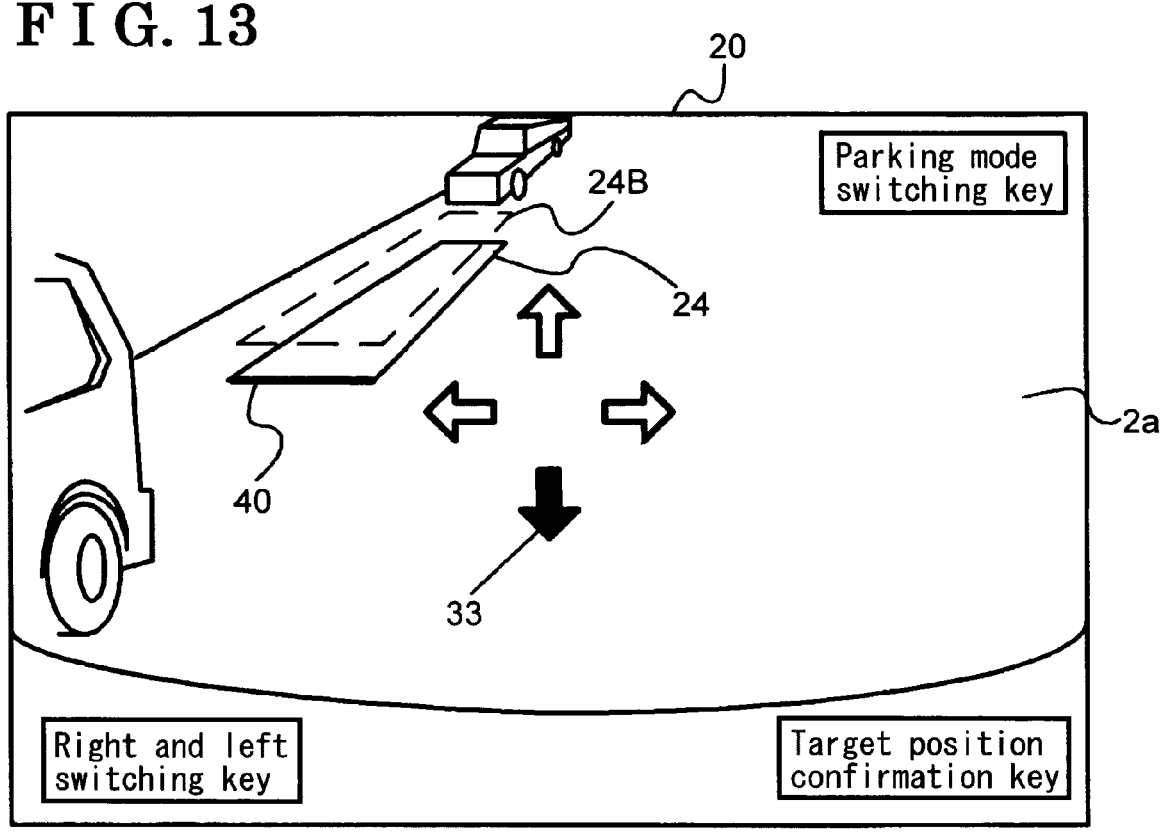
FIG. 13 is a view illustrating an example of a display of an edge of a target parking frame by use of a reaction color when operating the touch panel display in FIG. 3.
Figure 14:
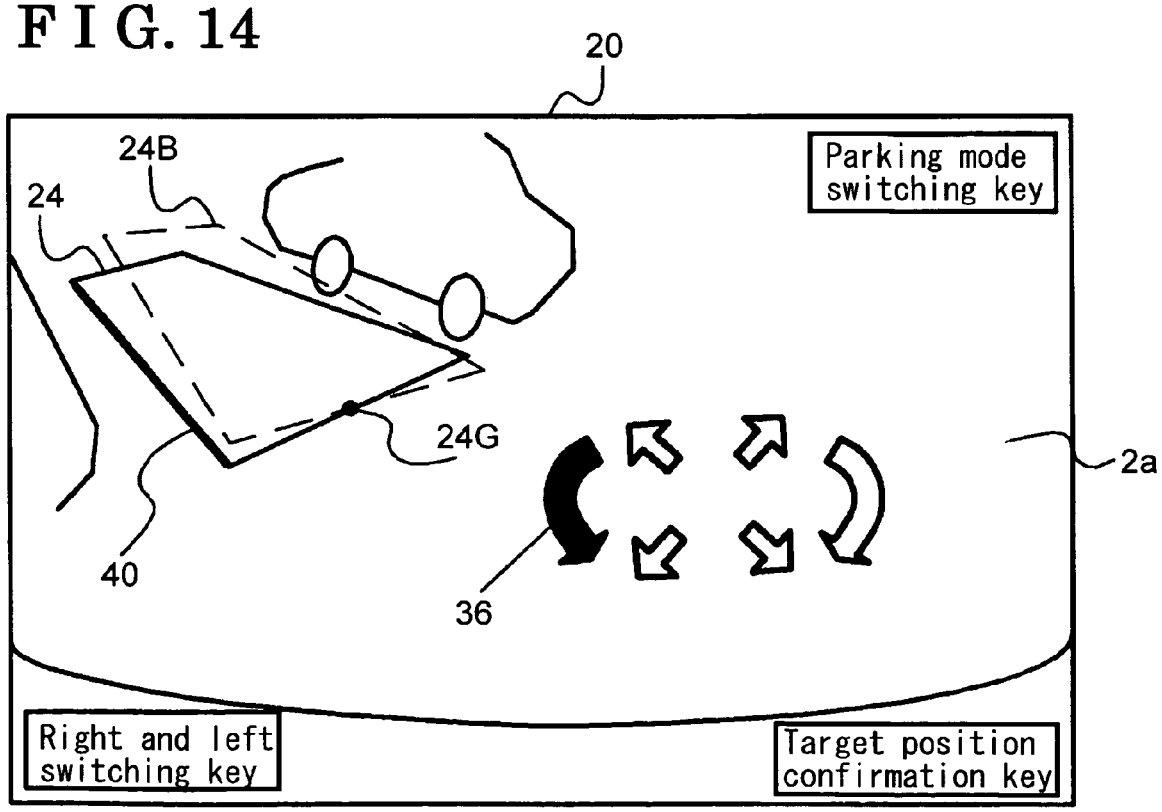
FIG. 14 is a view illustrating an example of a display of an edge of the target parking frame by use of a reaction color when turning the target parking frame counterclockwise.

According to this reaction color display process, as illustrated in FIG. 8, the CPU 12 judges which direction key or keys was pressed and relocates and sets the position of the target parking frame 24 in response to the direction of the indication key pressed (step S80). For example, when the down-pointing indication key 33 is pressed by the operator, an initial target parking frame 24B is moved downwardly and is relocated as a the target parking frame 24, as illustrated in FIG. 13. Likewise, when the counterclockwise rotation indication key 36 is pressed, the initial target parking frame 24B is rotated counterclockwise about the rotation center 24G, as illustrated in FIG. 14. When the clockwise rotation indication key 35 is pressed, the initial target parking frame 24B is rotated clockwise about the rotation center 24G, as illustrated in FIG. 15.

Figure 15:
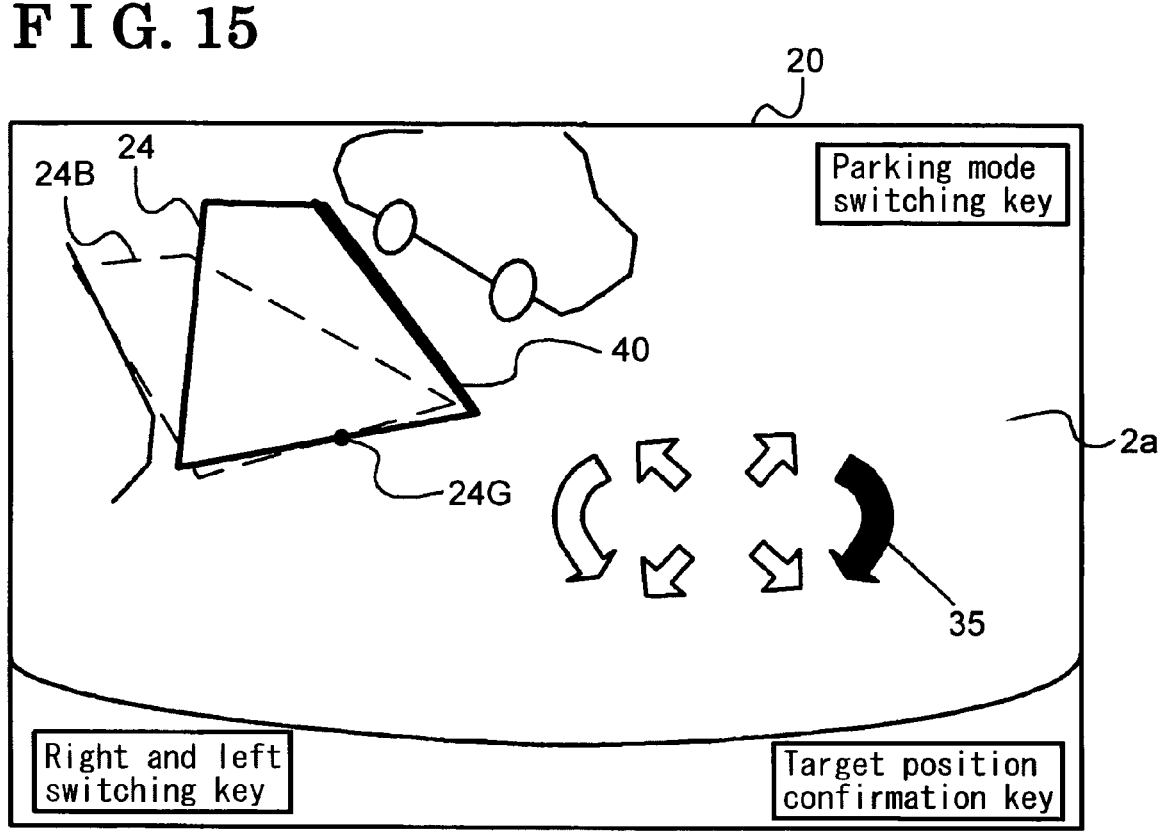
FIG. 15 is a view illustrating an example of a display of an edge of the target parking frame by use of a reaction color when turning the target parking frame clockwise.

Following the above operation, an edge of the target parking frame 24 on the image coordinate system, which is most closely located to or corresponds to the moving/rotating direction, is then displayed with a color different from the color of the other edges thereof, as illustrated in FIGS. 13, 14 and 15.

Figure 16:
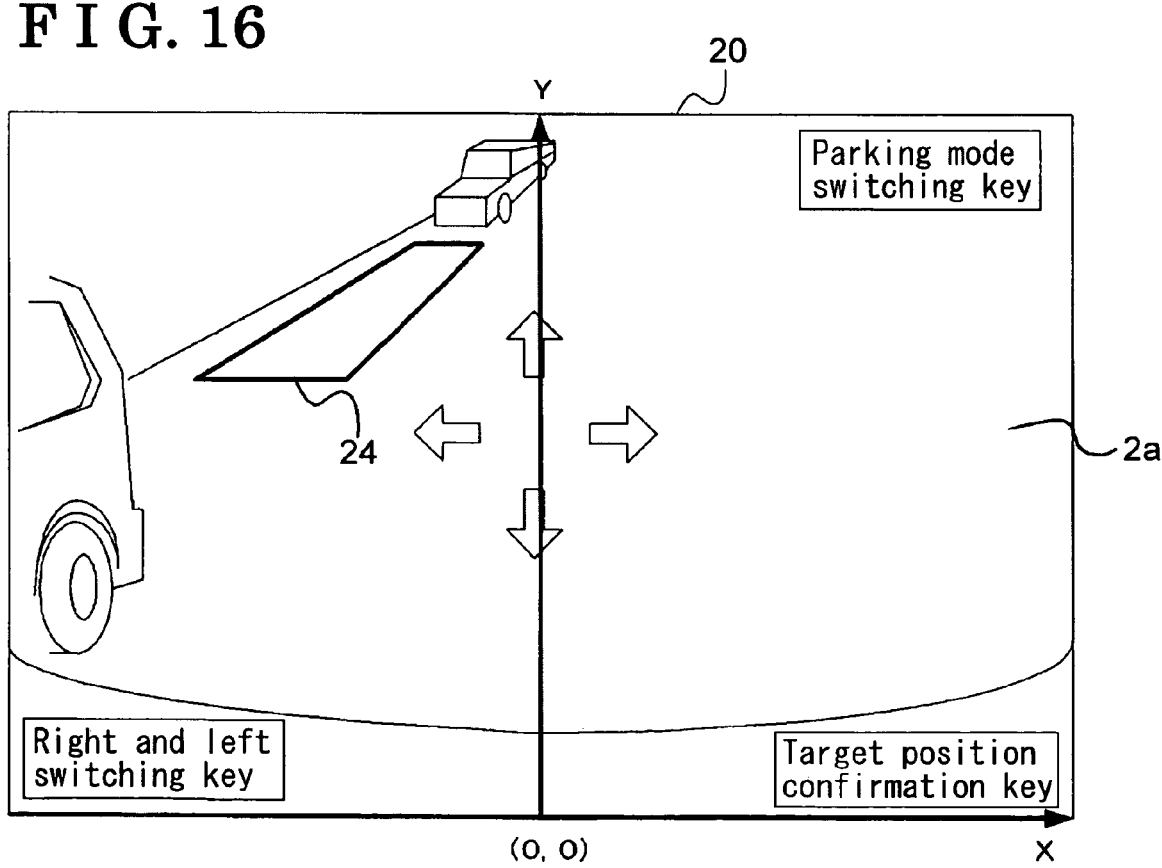
FIG. 16 is an explanatory view for explaining an image coordinate system in FIG. 8.

As is illustrated in FIG. 16, in step S81, the CPU 12 first sets an image coordinate system by setting an x-axis arranged horizontally relative to the bottom edge of the touch panel display 20 and a y-axis perpendicular to the x-axis. An origin (x=0, y=0) is located at the bottom intermediate portion of the touch panel display 20 in this xy-plane.

In step S82, the CPU 12 detects four points from the coordinate information on the target parking frame 24 in the xy-plane.

In step S83, the CPU 12 judges the value of the parking mode flag.

In step S83, when the CPU 12 judges that the parking mode flag represents a parallel parking, an affirmative answer "yes" is obtained and the program proceeds to step S84. In steps S84, S85 and S86, the CPU 12 more specifically identifies four points in the target parking frame 24 in xy-plane.

In step S84, the CPU 12 identifies a point from among the four points, which is most closely located to the origin (x=0, y=0) in the xy-plane, as a point A (xa, ya). In step S85, the CPU 12 identifies a point B. The point B is plotted at a B (xb, yb) for example. A difference between the plot point xb and the plot point xa is greater than a difference between the plot point yb and the plot point ya, on the basis of an absolute value. In step S86, the CPU 12 identifies a point C (xc, yc) and a point D (xd, yd) from among the other two points of the target parking frame 24. A distance of the point C (xc, yc) from the origin (x=0, y=0) is smaller than the distance of the point D (xd, yd) therefrom.

In step S87, the CPU 12 judges if the right-pointing indication key 32 has been pressed.

In step S87, when the CPU 12 judges that the right-pointing indication key 32 has been pressed, an affirmative answer "yes" is obtained. The program then proceeds to step S810 in which the CPU 12 displays an edge A-C of the target parking frame 24 with a color different from the color of the other edges of the target parking frame 24.

In step S87, when the CPU 12 does not judge that the right-pointing indication key 32 has been pressed, a negative answer "no" is obtained. The program then proceeds to step S88 in which the CPU 12 judges whether the left-pointing indication key 34 has been pressed.

In step S88, when the CPU 12 judges that the left-pointing indication key 34 has been pressed, an affirmative answer "yes" is obtained. The program then proceeds to step S811 in which the CPU 12 displays with a reaction color an edge B-D of the target parking frame 24 with a color different from the color of the other edges of the target parking frame 24.

In step S88, when the CPU 12 does not judge that the left-pointing indication key 34 has been pressed, a negative answer "no" is obtained. The program then proceeds to step S89 in which the CPU 12 judges whether the up-pointing indication key 31 has been pressed.

In step S89, when the CPU 12 judges that the up-pointing indication key 31 has been pressed, an affirmative answer "yes" is obtained. The program then proceeds to step S812 in which the CPU 12 displays an edge C-D of the target parking frame 24 with a color different from the color of the other edges of the target parking frame 24.

In step S89, when the CPU 12 does not judge that the up-pointing indication key 31 has been pressed, a negative answer "no" is obtained. The program then proceeds to step S813. In step S813, the CPU 12 recognizes that the down-pointing indication key 33 has been pressed and displays an edge A-B of the target parking frame 24 with a color different from the color of the other edges of the target parking frame 24. For example, with reference to FIG. 13, when the down-pointing indication key 33 is pressed, an edge 40 (moving direction indicator) connecting the point A and the point B of the target parking frame 24 is displayed with a color different from the one of the other edges thereof.

Meanwhile, in step S83, when the CPU 12 judges that the parking mode is a back-in parking, a negative answer "no" is obtained and the program proceeds to step S814. In step S814, the CPU 12 performs a back-in parking reaction color display process.

Figure 9:
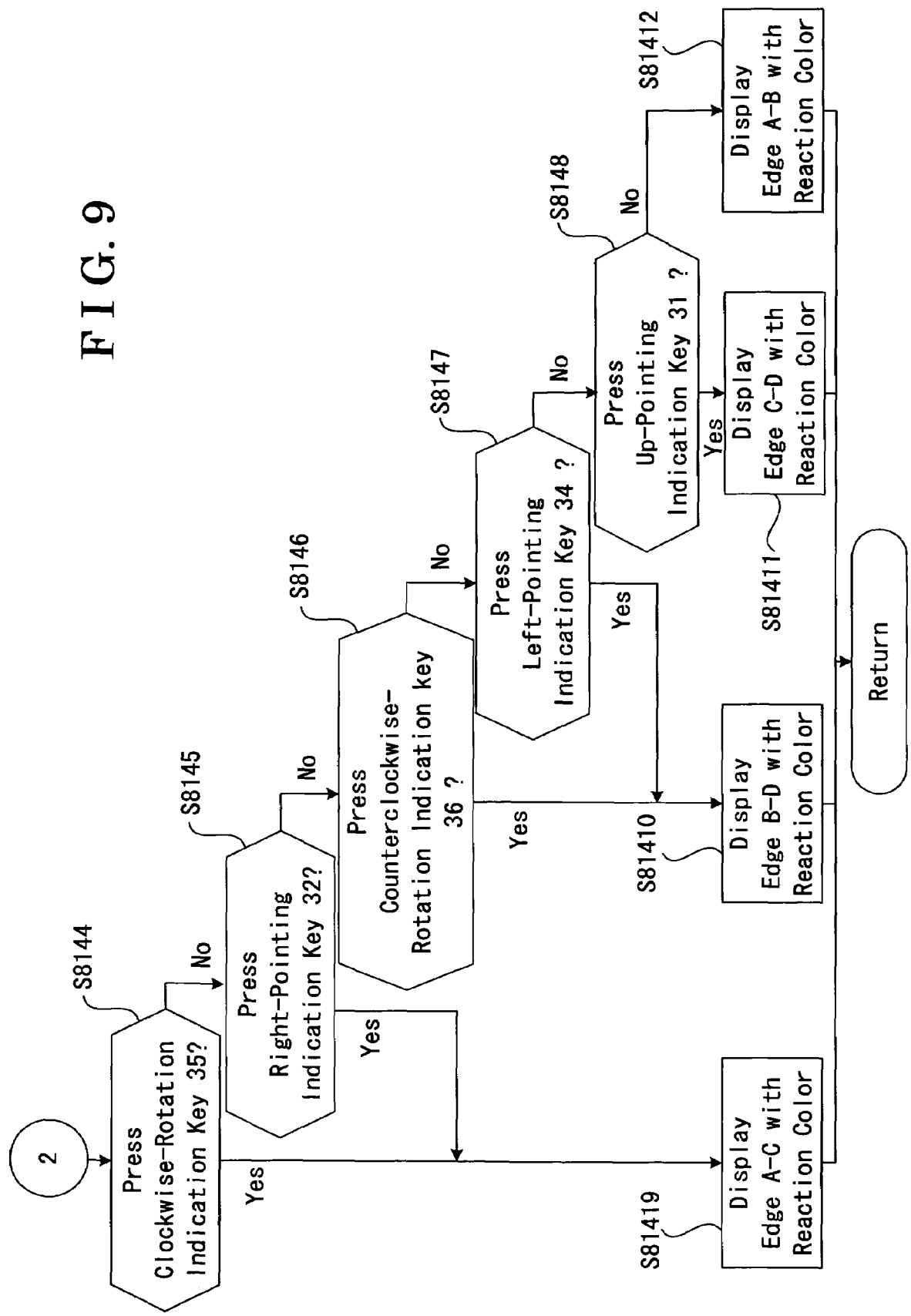
FIG. 9 is a flowchart for explaining a back-in reaction color display process in FIG. 8.

The back-in parking reaction color display process is described in detail in the flowchart illustrated in FIG. 9. The CPU 12 first identifies the points of the target parking frame 24 in steps S8141, 8142 and 8143.

In step S8141, the CPU 12 identifies a point A from among the four points, which is most closely located to the y-axis. In step S8142, the CPU 12 identifies a point B from among the other three points, which is most closely located to the origin (x=0, y=0). In step S8143, the CPU 12 identifies points C (xc, yx) and D (xd, yd). The distance of the point D from the y-axis is greater than the distance of the point C from the y-axis.

In step S8144, the CPU 12 judges whether the clockwise-rotation indication key 35 has been pressed.

In step S8144, when the CPU 12 does not judge that the clockwise-rotation indication key 35 has been pressed, a negative answer "no" is obtained. The program then proceeds to step S8145 in which the CPU 12 judges whether the right-pointing indication key 32 has been pressed.

In step S8144, when the CPU 12 judges that the clockwise-rotation indication key 35 has been pressed, an affirmative answer "yes" is obtained. The program then proceeds to step S8149 in which the CPU 12 displays an edge A-C of the target parking frame 24 with a color different from the one of the other edges thereof, as illustrated in FIG. 15. Otherwise, when the CPU 12 judges in step S 8145 that the right-pointing indication key 32 has been pressed, the program proceeds to step S8149. In step S8149, the CPU 12 displays the edge A-C of the target parking frame 24 with a color different from the one of the other edges thereof, as illustrated in FIG. 15.

In step S8145, when the CPU 12 does not judge that the right-pointing indication key 32 has been pressed, a negative answer "no" is obtained. The program then proceeds to step S8146 in which the CPU 12 judges whether the counterclockwise-rotation indication key 36 has been pressed.

In step S8146, when the CPU 12 does not judge that the counterclockwise-rotation indication key 36 has been pressed, a negative answer "no" is obtained. The program then proceeds to step S8147 in which the CPU 12 judges whether the left-pointing indication key 34 has been pressed.

In step S8146, when the CPU 12 judges that the counterclockwise-rotation indication key 36 has been pressed, an affirmative answer "yes" is obtained. The program then proceeds to step S81410 in which the CPU 12 displays an edge B-D of the target parking frame 24 with a color different from the one of the other edges thereof, as illustrated in FIG. 14 Otherwise, when the CPU 12 judges in step S 8147 that the the left-pointing indication key 34 has been pressed, the program proceeds to step S81410. In step S81410, the CPU 12 displays the edge B-D of the target parking frame 24 with a color different from the one of the other edges thereof, as illustrated in FIG. 14.

In step S8147, when the CPU 12 does not judge that the left-pointing indication key 34 has been pressed, a negative answer "no" is obtained. The program then proceeds to step S8148 in which the CPU 12 judges whether the up-pointing indication key 31 has been pressed.

In step S8148, when the CPU 12 judges that the up-pointing indication key 31 has been pressed, an affirmative answer "yes" is obtained. The program then proceeds to step S81411 in which the CPU 12 displays an edge C-D of the target parking frame 24 with a color different from the one of the other edges thereof.

In step S8148, when the CPU 12 does not judge that the up-pointing indication key 31 has been pressed, a negative answer "no" is obtained. The program then proceeds to step S81412 in which the CPU 12 displays an edge A-B of the target parking frame 24 with a color different from the one of the other edges thereof.

As described above, the back-in parking reaction color display process in step S814 is ended and the reaction color display process in step S8 is also ended. The program then shifts to the next routine.

After distinguishably displaying or highlighting an edge of the target parking frame 24 corresponding to the moving/rotating direction in step S8, the program returns to step S5 and repeats the above-described operation. Accordingly, the target parking frame in the image-coordinate system is moved on the touch panel display 20.

In step S5, when the CPU 12 judges that an operation for modifying the displayed position of the target parking frame 24 has not been inputted, a negative answer "no" is obtained and the program proceeds to step S6. In step S6, the CPU 12 judges whether the target position confirmation key 21 has been pressed by the operator.

Figure 10:
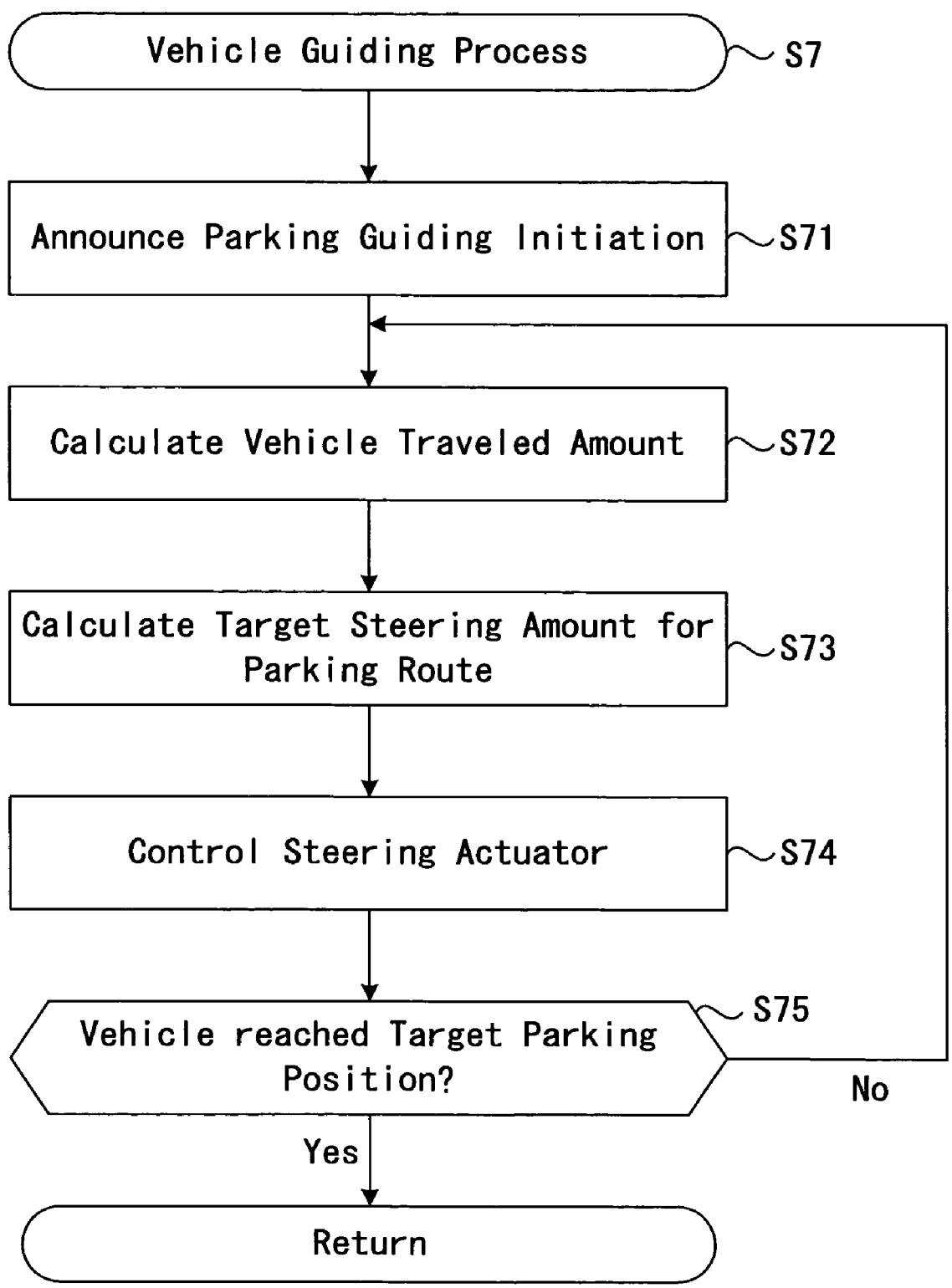
FIG. 10 is a flowchart for explaining a vehicle guiding process in FIG. 5.
Figure 11:
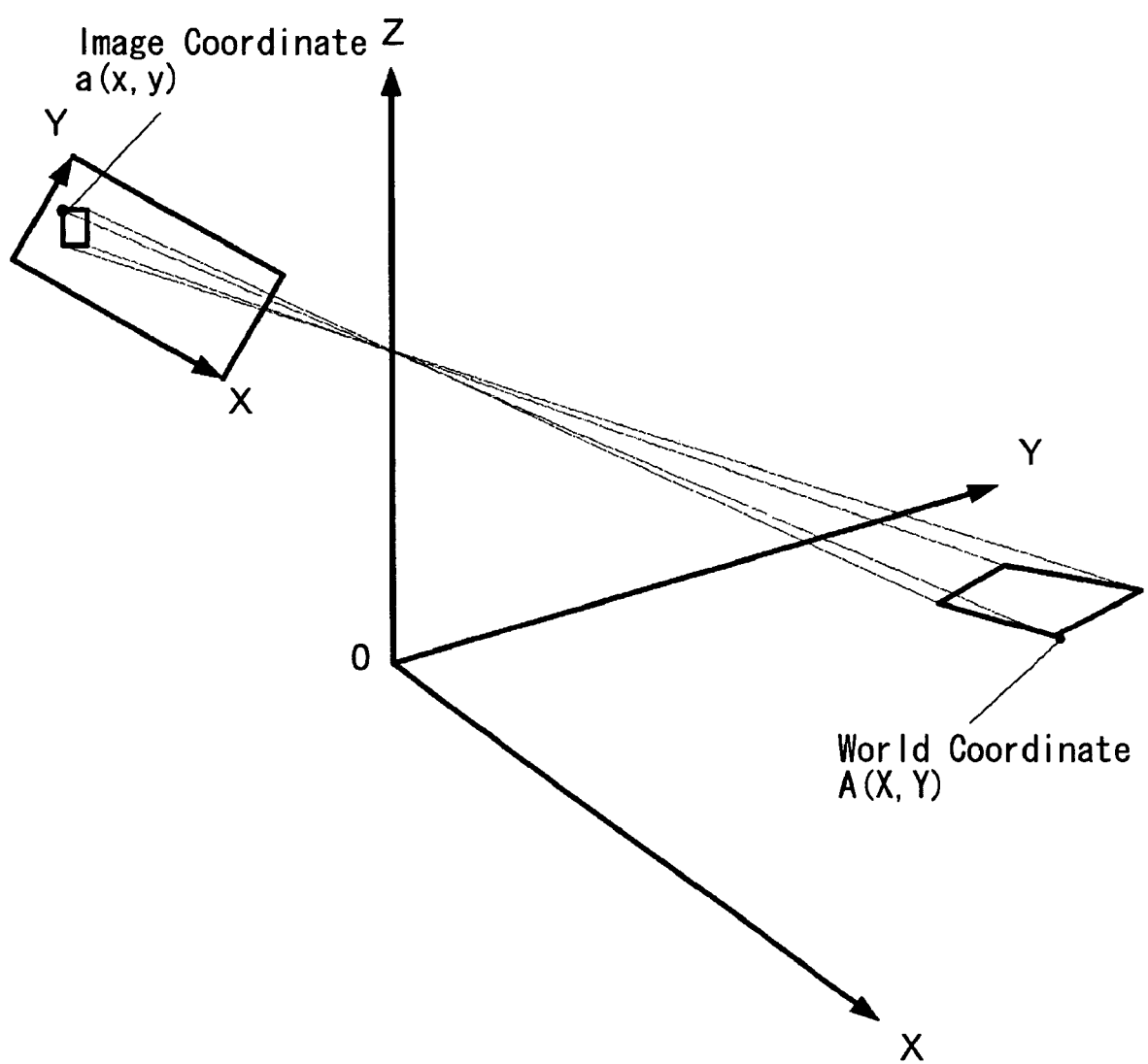
FIG. 11 is an explanatory view for explaining a coordinate system conversion by the target parking position setting apparatus illustrated in FIG. 1.

In step S6, when the CPU 12 judges that the target position confirmation key 21 has been pressed, an affirmative answer "yes" is obtained and a vehicle guiding process is started in step S7, as illustrated in FIG. 10.

During the vehicle guiding process, the vehicle guiding is started by the sounds or voice emitted from the loud speaker 8 and the display on the touch panel display 20.

Figure 12:
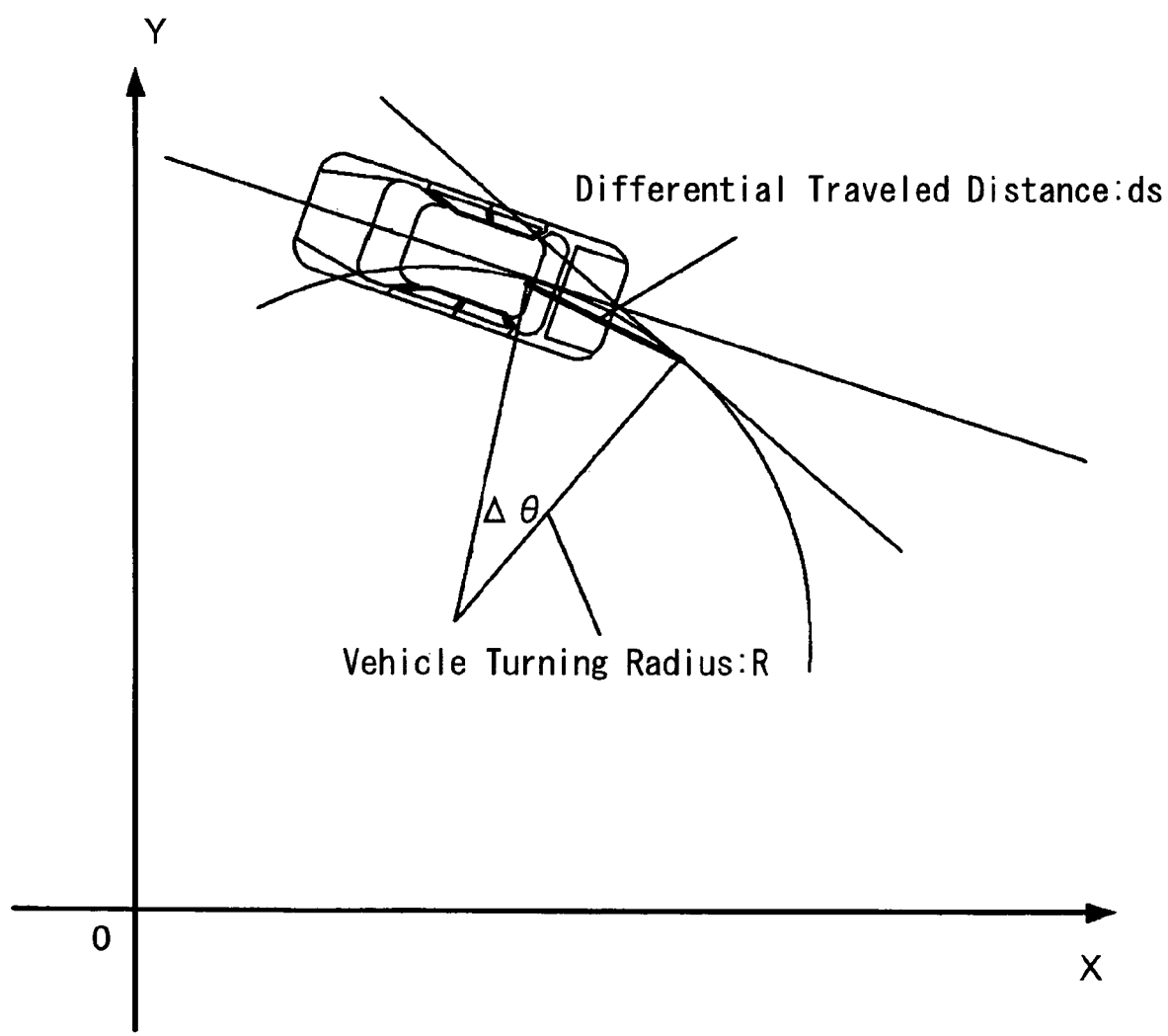
FIG. 12 is an explanatory view for explaining a movement of the vehicle.

In step S71, the CPU 12 audibly warns the operator of the start of the vehicle guiding. In step S72, the CPU 12 computes the traveled distance of the vehicle 100 on the basis of the information of the steering angle sensor 4; the rear-right wheel speed sensor 5; and the rear-left wheel speed sensor 6. The traveled distance of the vehicle 100 is defined in a xy-plane as illustrated in FIG. 12. The CPU 12 computes the traveled distance or amount of the vehicle 100 in accordance with the formulas 3, 4 and 5 memorized in the ROM 11.

$$\theta = \int_0^a \frac{1}{R} \cdot ds \qquad \text{Formula 3}$$

$$X = \int_0^a \sin\theta \cdot ds \qquad \text{Formula 4}$$

$$Z = \int_0^a \cos\theta \cdot ds \qquad \text{Formula 5}$$

The "ds" indicates a differential traveled distance and is calculated on the basis of a rotation amount of each tire detected by the rear-right wheel speed sensor 5 and/or the rear-left wheel speed sensor 6. The "R" indicates a turning radius of the vehicle 100 and is obtained by the value detected by the steering angle sensor 4. The "α" indicates an accumulated traveled distance of the vehicle 100 from a position where the parking operation was started.

In step S73, the CPU 12 computes a target steering amount relative to the parking route. In step S74, the CPU 12 controls the steering actuator 7 on the basis of the target steering amount calculated in step S73. Therefore, the operator can park the vehicle 100 in the target parking frame 24 by adjusting a vehicle traveling speed as needed without operating the steering wheel 4a.

In step S75, the CPU 12 judges whether the vehicle 100 has reached the target parking position. The processes from step S72 to S75 are repeated until the vehicle 100 reaches the target parking position at step S75.

As described above, according to the target parking position setting apparatus of the embodiment, when the operator sets a target parking position by using the touch panel display 20, the touch panel display 20 displays therein a moving/rotating direction of the frame 24 representing the target parking position. Therefore, this apparatus assists the operator to understand the moving/rotating direction of the frame 24 with each and facilitates an operation for setting the target parking position.

Further, the edge 40 (the moving direction indicator), which corresponds to the moving or rotating direction of the target parking frame 24, is displayed with a color different from the color of the other edges of the target parking frame 24. The moving or rotating direction of the target parking frame 24 becomes distinguishable on the touch panel display 20. However, the present invention is not limited to the above-description. For example, an edge of the target parking frame 24, which corresponds to the moving or rotating direction, can be displayed with a thicker line than others or with double lines. Alternatively, the moving or rotating direction can be visibly depicted with some other moving/rotating direction indicators such as an arrow.

In the vehicle guiding apparatus according to the above embodiment, an operator needs to operate a brake for the purpose of parking the vehicle 100. However, the brake operation can be automatically controlled.

Further, it is possible to display any of the keys 31-36 pressed for movement or rotation of the target parking frame 24 distinguishably with a color different from the one of the other keys. In this case, these keys 31-36 act as a moving/rotation direction indicator.

According to the above embodiment, the vehicle 100 is automatically steered in favor of the steering actuator 7. However, the target parking position can be displayed without the use of the steering actuator 7.

Still further, as disclosed in JP2005-067565A, the target parking position setting apparatus can be provided with a target parking position memorizing means which memorizes a target parking position at which the vehicle 100 is often parked, such as a house garage and so on. The target parking position memorizing means employs one of the target parking positions memorized and sets as a target parking position as needed.

Still further, as disclosed in JP2005-067565A, the target parking position setting apparatus can determine the parking mode in a different way. For example, the target parking position setting apparatus can judge the parking mode on the basis of a locus of angle deviations of the steering angle sensor 4 per predetermined distance or time. When the angle deviation is equal to or less than a specific threshold value, the target parking position setting apparatus can judge that the parking mode is a parallel parking, Still further, it is possible to perform the above-described processes by the ECU 10 in which a program for performing the above-described operations of the ECU 10, especially the reaction color display process, is stored. For example, the ECU 10 can be supplied with the program which is stored in a predetermined medium or can be supplied with the program via a communication.

In the above-embodiments, the parking position display controlling means includes the ECU 10, the up-pointing indication key 3 1, the right-pointing indication key 32, the down-pointing indication key 33, the left-pointing indication key 34, the clockwise-rotation indication key 35, and the counterclockwise-rotation indication key 36. The guiding means includes the ECU 10, the touch panel display 20, the loud speaker 8 and the steering actuator 7.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A target parking position setting apparatus, comprising:
    image capturing means adapted for a vehicle and capturing an image of an outside of the vehicle;
    displaying means provided inside the vehicle and displaying an image captured by the image capturing means on a display screen;
    parking position display controlling means for displaying on the display screen of the displaying means a mark representing a provisional target parking position by superimposing the mark on the image captured by the image capturing means, the parking position display controlling means moving a display position of the mark in response to an instruction of an operator and displaying on the display screen a moving direction indicator indicating a moving direction of the mark; and
    setting means for setting the display position of the mark on the image captured by the image capturing means as a target parking position in response to an instruction of the operator,
    wherein the mark representing the provisional target parking position and the target parking position is a target parking frame, the parking position display controlling means displays the target parking frame on the display screen and moves the display position of the target parking frame in response to an instruction of the operator, and the parking position display controlling means displays at least an edge of the target parking frame, which corresponds to a moving direction of the target parking frame, distinguishably from among plural edges of the target parking frame when moving the target parking frame displayed on the display screen.

2. A target parking position setting apparatus according to claim 1, wherein the parking position display controlling means displays the edge corresponding to the moving direction of the target parking frame with a color different from a color of the other edges of the target parking frame.

3. A target parking position setting apparatus according to claim 1, wherein the parking position display controlling means includes:
    an up-pointing indicator for moving the target parking frame in an upward direction on the display screen;
    a down-pointing indicator for moving the target parking frame in a downward direction on the display screen;
    a left-pointing indicator for moving the target parking frame in a left direction on the display screen; and
    a right-pointing indicator for moving the target parking frame in a right direction on the display screen, and
    wherein the parking position display controlling means moves the target parking frame in the upward direction on the display screen and displays distinguishably an upper edge among from a plurality of edges defining the target parking frame in response to an operation of the up-pointing indicator,
    the parking position display controlling means moves the target parking frame in the downward direction on the display screen and displays distinguishably a lower edge among from the edges defining the target parking frame in response to an operation of the down-pointing indicator,
    the parking position display controlling means moves the target parking frame in the left direction on the display screen and displays distinguishably a left edge among from the edges defining the target parking frame in response to an operation of the left-pointing indicator, and
    the parking position display controlling means moves the target parking frame in a right direction on the display screen and displays distinguishably a right edge among from the edges defining the target parking frame in response to an operation of the right-pointing indicator.

4. A target parking position setting apparatus according to claim 1, wherein the parking position display controlling means includes:
    an up-pointing indicator operated for moving the target parking frame in an upward direction on the display screen;
    a down-pointing indicator for moving the target parking frame in a downward direction on the display screen;
    a left-pointing indicator for moving the target parking frame in a left direction on the display screen;
    a right-pointing indicator for moving the target parking frame in a right direction on the display screen;

a counterclockwise-rotation indicator for moving the target parking frame counterclockwise about a predetermined rotation point; and a clockwise-rotation indicator for moving the target parking frame clockwise about the predetermined rotation point, and wherein the parking position display controlling means moves the target parking frame in the upward direction on the display screen and displays distinguishably an upper edge among from a plurality of edges defining the target parking frame in response to an operation of the up-pointing indicator, the parking position display controlling means moves the target parking frame in the downward direction on the display screen and displays distinguishably a lower edge among from the edges defining the target parking frame in response to an operation of the down-pointing indicator, the parking position display controlling means moves the target parking frame in the left direction on the display screen and displays distinguishably a left edge among from the edges defining the target parking frame in response to an operation of the left-pointing indicator, the parking position display controlling means moves the target parking frame in a right direction on the display screen and displays distinguishably a right edge among from the edges defining the target parking frame in response to an operation of the right-pointing indicator, the parking position display controlling means rotates the target parking frame counterclockwise on the display screen about the predetermined rotation point and displays distinguishably an edge of the target parking frame, which is located at the side of the counterclockwise direction, from among the edges defining the target parking frame in response to an operation of the counterclockwise-rotation indicator; and the parking position display controlling means rotates the target parking frame clockwise on the display screen about the predetermined rotation point and displays distinguishably an edge of the target parking frame, which is located at the side of the clockwise direction, from among the edges defining the target parking frame in response to an operation of the clockwise-rotation indicator.

5. A vehicle comprising:

image capturing means adapted for a vehicle and capturing an image of an outside of the vehicle;

displaying means provided inside the vehicle and displaying an image captured by the image capturing means on a display screen;

parking position display controlling means for displaying on the display screen of the displaying means a mark representing a provisional target parking position by superimposing the mark on the image captured by the image capturing means, the parking position display controlling means moving a display position of the mark in response to an instruction of an operator and displaying on the display screen a moving direction indicator indicating a moving direction of the mark;

setting means for setting the display position of the mark on the image captured by the image capturing means as a target parking position in response to an instruction of the operator; and guiding means for guiding the vehicle to the target parking position set by the setting means, wherein the mark representing the provisional target parking position and the target parking position is a target parking frame, the parking position display controlling means displays the target parking frame on the display screen and moves the display position of the target parking frame in response to an instruction of the operator, and the parking position display controlling means displays at least an edge of the target parking frame, which corresponds to a moving direction of the target parking frame, distinguishably from among plural edges of the target parking frame when moving the target parking frame displayed on the display screen.

6. A vehicle according to claim 5, wherein the parking position display controlling means displays the edge corresponding to the moving direction of the target parking frame with a color different from a color of the other edges of the target parking frame.

7. A vehicle according to claim 5, wherein the parking position display controlling means includes:

an up-pointing indicator for moving the target parking frame in an upward direction on the display screen;

a down-pointing indicator for moving the target parking frame in a downward direction on the display screen;

a left-pointing indicator for moving the target parking frame in a left direction on the display screen; and a right-pointing indicator for moving the target parking frame in a right direction on the display screen, and wherein the parking position display controlling means moves the target parking frame in the upward direction on the display screen and displays distinguishably an upper edge among from a plurality of edges defining the target parking frame in response to an operation of the up-pointing indicator, the parking position display controlling means moves the target parking frame in the downward direction on the display screen and displays distinguishably a lower edge among from the edges defining the target parking frame in response to an operation of the down-pointing indicator, the parking position display controlling means moves the target parking frame in the left direction on the display screen and displays distinguishably a left edge among from the edges defining the target parking frame in response to an operation of the left-pointing indicator, and the parking position display controlling means moves the target parking frame in a right direction on the display screen and displays distinguishably a right edge among from the edges defining the target parking frame in response to an operation of the right-pointing indicator.

8. A vehicle according to claim 5, wherein the parking position display controlling means includes:

an up-pointing indicator operated for moving the target parking frame in an upward direction on the display screen;

a down-pointing indicator for moving the target parking frame in a downward direction on the display screen;

a left-pointing indicator for moving the target parking frame in a left direction on the display screen;

a right-pointing indicator for moving the target parking frame in a right direction on the display screen;

a counterclockwise-rotation indicator for moving the target parking frame counterclockwise about a predetermined rotation point; and a clockwise-rotation indicator for moving the target parking frame clockwise about the predetermined rotation point, and wherein the parking position display controlling means moves the target parking frame in the upward direction on the display screen and displays distinguishably an upper edge among from a plurality of edges defining the target parking frame in response to an operation of the up-pointing indicator, the parking position display controlling means moves the target parking frame in the downward direction on the display screen and displays distinguishably a lower edge among from the edges defining the target parking frame in response to an operation of the down-pointing indicator, the parking position display controlling means moves the target parking frame in the left direction on the display screen and displays distinguishably a left edge among from the edges defining the target parking frame in response to an operation of the left-pointing indicator, the parking position display controlling means moves the target parking frame in a right direction on the display screen and displays distinguishably a right edge among from the edges defining the target parking frame in response to an operation of the right-pointing indicator, the parking position display controlling means rotates the target parking frame counterclockwise on the display screen about the predetermined rotation point and displays distinguishably an edge of the target parking frame, which is located at the side of the counterclockwise direction, from among the edges defining the target parking frame in response to an operation of the counterclockwise-rotation indicator; and the parking position display controlling means rotates the target parking frame clockwise on the display screen about the predetermined rotation point and displays distinguishably an edge of the target parking frame, which is located at the side of the clockwise direction, from among the edges defining the target parking frame in response to an operation of the clockwise-rotation indicator.

9. A computer readable medium storing a computer program implementing processes comprising:

capturing an image of the outside of a vehicle by an image capturing device;

displaying the image captured by the image capturing device on a display device;

superimposing a mark representing a provisional target parking position of the vehicle on the captured image and displaying the mark on the displaying device;

moving a display position of the mark on a display screen of the display device in response to an operation by an operator; and displaying a moving direction indicator representing a moving direction of the mark on the display screen of the display device in response to an operation by the operator, wherein the mark representing the provisional target parking position and the target parking position is a target parking frame, and wherein the processes flirt her comprise:

displaying the target parking frame on the display screen and moving the display position of the target parking frame in response to an instruction of the operator and displaying at least an edge of the target parking frame, which corresponds to a moving direction of the target parking frame, distinguishably from among plural edges of the target parking frame when moving the target parking frame displayed on the display screen.

* * * * *